July 9, 1946.  J. H. CARPENTER  2,403,579
LUBRICATING SYSTEM FOR TWO-SPEED TRANSMISSIONS
Filed Dec. 18, 1943  2 Sheets-Sheet 1

Inventor
John H. Carpenter
By Fred Gerlach
his Atty.

July 9, 1946. J. H. CARPENTER 2,403,579
LUBRICATING SYSTEM FOR TWO-SPEED TRANSMISSIONS
Filed Dec. 18, 1943 2 Sheets-Sheet 2

Inventor
John H. Carpenter
By Fred Gerlach
his Atty

Patented July 9, 1946

2,403,579

UNITED STATES PATENT OFFICE 2,403,579

LUBRICATING SYSTEM FOR TWO-SPEED TRANSMISSIONS

John H. Carpenter, Williamsport, Pa., assignor to The Aviation Corporation, New York, N. Y., a corporation of Delaware Application December 18, 1943, Serial No. 514,731

19 Claims. (Cl. 184—6)

The invention relates to lubricating systems for two-speed transmissions for driving the supercharger of an internal combustion engine.

One object of the invention is to provide efficient means for lubricating two-speed transmissions in which planetary gearing is controlled for driving at two speeds by a pair of clutches.

Another object of the invention is to provide improved lubricating means in which the oil from the bearings for the input shaft and bearings for the sun-gear shaft within the input shaft is conducted through the sun-gear shaft to an overrunning clutch and a brake clutch which control the two speed operation of the planetary gearing.

Other objects of the invention will appear from the detailed description.

The invention consists in the several novel features hereinafter set forth and more particularly defined by claims at the conclusion hereof.

Figure 1:
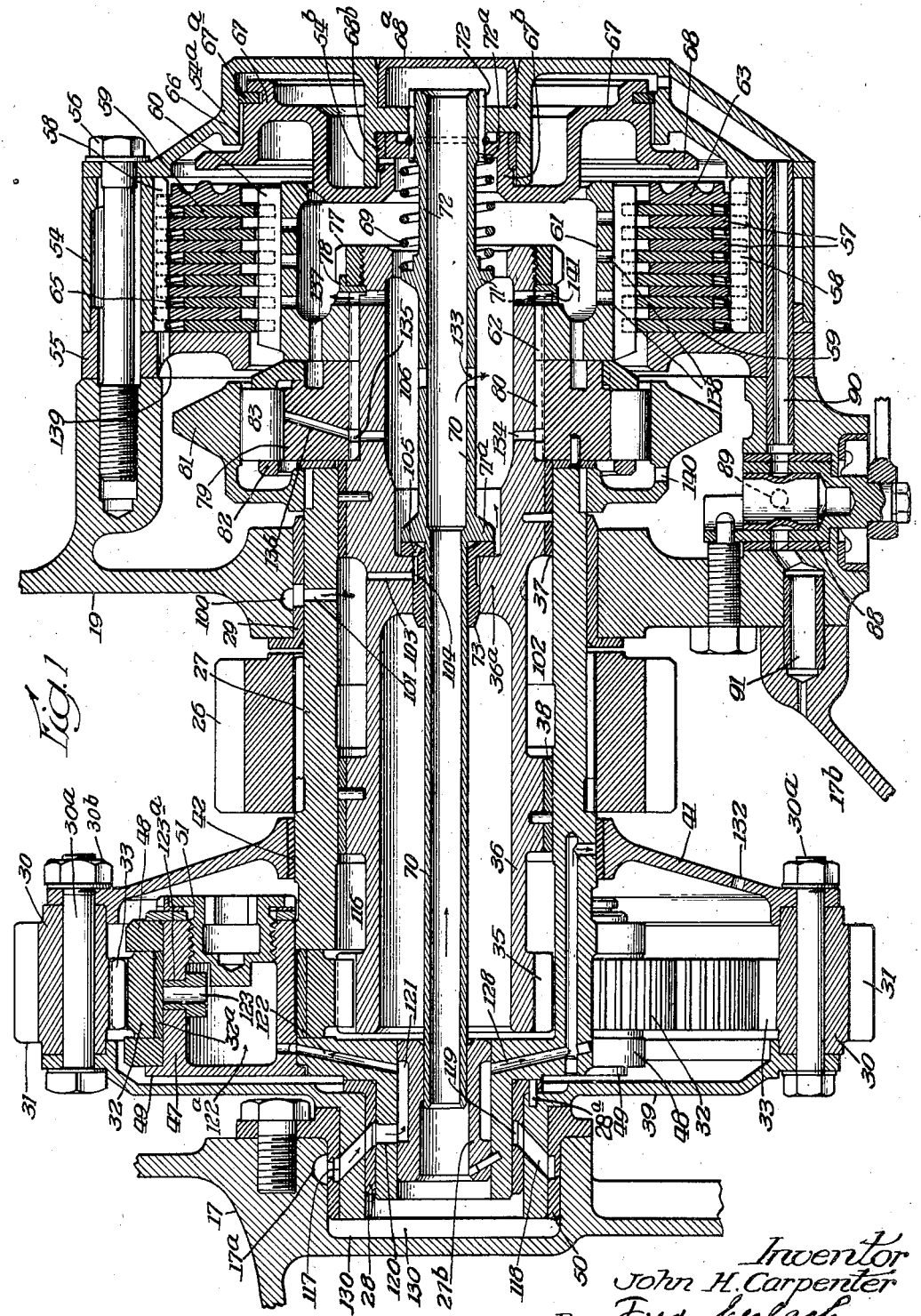
Fig. 1 is a vertical longitudinal section of a two-speed transmission embodying the invention.
Figure 2:
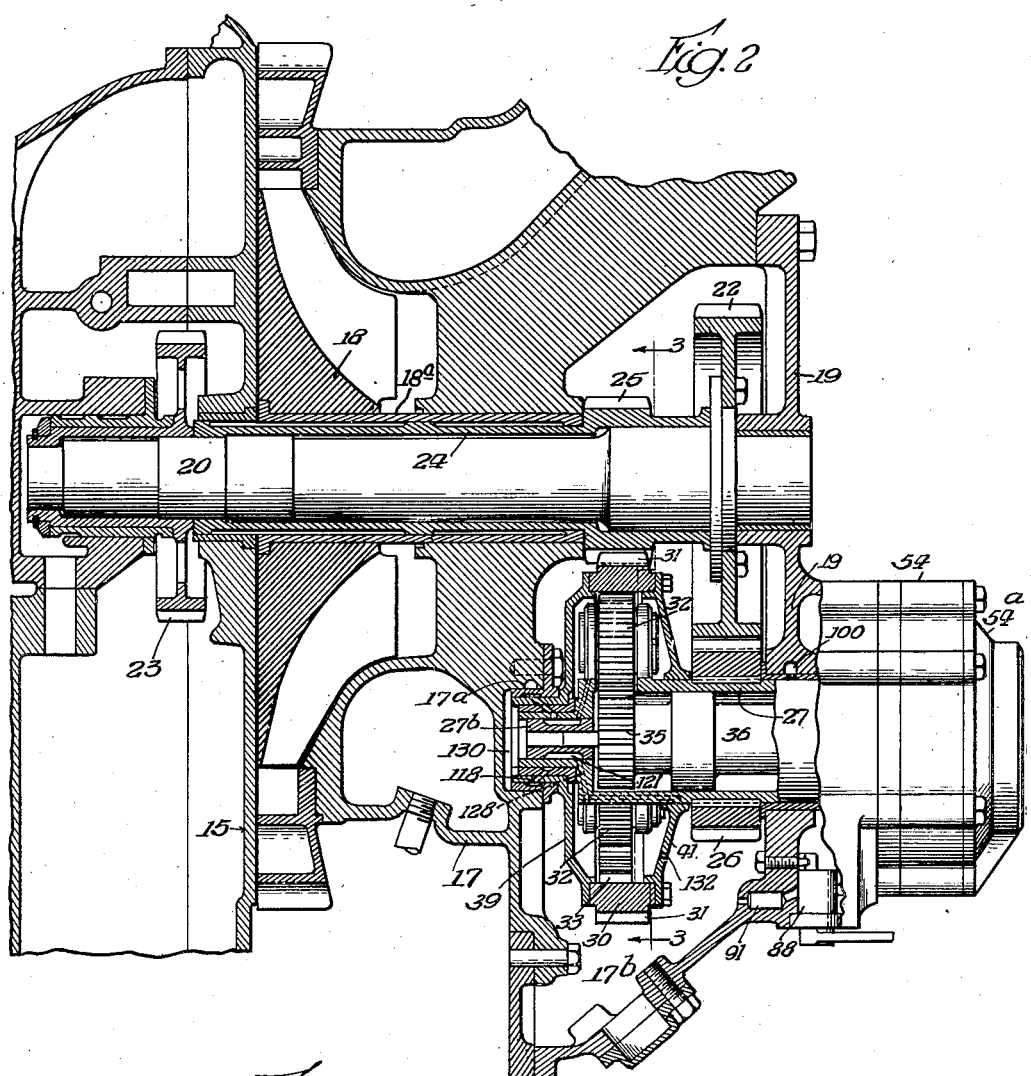
Fig. 2 is a section illustrating the driving mechanism for the transmission and the impeller of the supercharger driven by the transmission, parts being shown in elevation.
Figure 3:
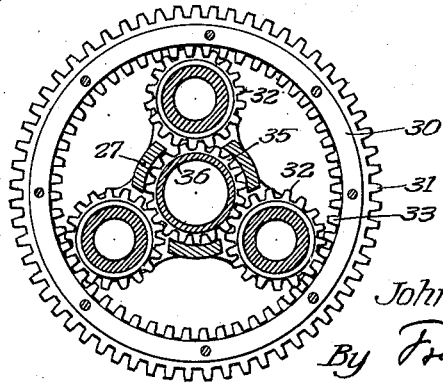
Fig. 3 is a section taken on line 3—3 of Fig. 2.

The invention is exemplified in two-speed transmission in a casing comprising the end section 15 of an engine-casing which usually contains the gearing for driving the engine auxiliaries; a section 17 which encloses the impeller 18 of the supercharger, and a head 19 which with section 17 encloses and supports parts of the two-speed transmission.

A shaft 20 has fixed thereon a gear 23 which is driven from the engine in any suitable manner, and a gear 22 on shaft 20 which meshes with the input gear 26 of the two-speed transmission. The impeller 18 in casing section 17 is fixed to a sleeve shaft 18$^a$, which in turn is rotated by a sleeve-shaft 24 which surrounds the drive shaft 20. A gear 25, integral with shaft 24, meshes with and is driven by the output gear of the two-speed transmission.

The two-speed transmission comprises a gear 26 which is splined to the hollow input shaft 27 which is journaled in a bushing 29 in the head 19 and in a bushing 28; an output gear ring 30 which has external gear teeth 31 meshing with the gear 25 on the impeller shaft 24 and is rotatably carried by a support which comprises side members 39 and 41; a set of planet gears 32 which mesh with internal gear teeth 33 on ring 30 and with the teeth of a sun-gear 35; and a hollow sun-gear shaft 36 which is integral with the sun-gear 35 and is provided with bushings 37 and 38 which are journaled in the inner periphery of the hollow input shaft 27 for rotation of shaft 36 relative to shaft 27. Side member 39 of the support for ring 30 has a hub which is journaled in a bushing 50 which is fixed in the casing section 17 and the opposite side member 41 is supported for rotational movement on bushing 42 on the input shaft 27. Bolts 30$^a$ extend through and with nuts 30$^b$ secure together the side members 39 and 41 with the gear ring 30 between them. Bushing 28 in which the inner end of the input shaft 27 is journaled, is fixedly secured in the hub of side member 39 of the gear-ring 30 by a pin 28$^a$. Each planet gear 32 is carried by and journaled on a hollow stud-shaft 47 which is secured in a pair of flanges 48 which are integral with the input shaft 27 and between which the planet gears are confined against endwise movement. Each stud-shaft 47 is hollow, closed and provided at one end with a flange 49 which abuts against the outer side of one of the flanges 48. A flanged cap 51 is screw-threaded into and closes the other end of said stud-shaft, and locks each stud-shaft in the flanges 48. Each planet gear 32 is provided with a bearing-bushing 32$^a$ which fits around and is journaled on the stud-shaft 47 and rotates with gear 32.

When the input shaft 27, through the one-way clutch hereinafter described, drives the sun-gear shaft 36, sun-gear 35, planet-gears 32 and gear-ring 30 will rotate as a unit with the input shaft, and drive the impeller at low speed ratio. When sun-gear shaft 36 is braked against rotation relative to the input shaft 27 by the hydraulically controlled disk-clutch hereinafter described, the input shaft 27 will impart planetary movement to the planet-gears 32 around sun-gear 35, and ring 30 will be driven at a higher speed than the input shaft to drive the impeller at the high speed ratio.

The disk-clutch for selectively braking shaft 36 and sun-gear 35 for the high-speed operation of the impeller and for releasing them for rotation with the input shaft 27 for the low-speed operation of the impeller is hydraulically controlled and mounted in a non-rotatable housing which comprises an annular section 54, an inner plate 55 and a cover-plate 54$^a$ which are secured by bolts 56 to head 19. This disk-clutch comprises a non-rotatable set of friction-disks or plates 57 which are slidably splined at 58 to the housing section 54 and a set of intermediate disks or plates 59 which are slidably splined, as at 60, to a hub or member 61 which is rigidly secured by splines 62 to and adjacent the outer end of the sun-gear shaft 36. A plate 63 is slidably splined at 58 to the housing section 54 for pressing the disks 57, 59 into gripping relation and securing the sun-gear shaft 36 against rotation. When disks 59 are frictionally gripped by the non-rotatable disks 57, the sun-gear shaft 36 will be braked against rotation by input shaft 27. Resilient spreaders 65 may be interposed between the disks 57 to urge the disks 57 away from contact with disks 59.

The plate 63 is slidably splined at 58 to the housing section 54 for engaging the clutch to brake the sun-gear shaft 36. This plate 63 is controlled by a hydraulic device which comprises a cylinder 66 which is formed in the cover-section or plate 54ª and a piston 67 which is slidable in said cylinder and provided with a piston ring 67ª and a flange 68 for engaging plate 63. The piston 67 is provided with an out-turned hub 67ᵇ with a bushing 68ᵇ which is slidable in an inwardly extending cylindrical member 54ᵇ on the cover-section 54ª. A compression spring 69 is applied to press the piston 67 normally into its clutch releasing position. The flange 68 on piston 67 is adapted to abut against the plate 63 for forcing the disks or plates 57 and 59 into gripping relation and locking the sun-gear shaft 36 against rotation. A tube 70 is splined at 72 to, and held against rotation by, the cover plate 54ª. An annular shoulder 71 on tube 70 functions as an abutment for the spring 69. A bushing 73 is secured in a cross-wall 36ª of the hollow sun-gear shaft 36 and is provided with a thrust-face which is engaged by a thrust face on annular shoulder 71ª on the spring-pressed tube 70. The tube 70 extends through the bushing 73 in the cross-wall 36ª in the sun-gear shaft, and its inner end extends into and fits in a ring 27ᵇ which is secured in the hub of reduced diameter on the inner end of the input shaft 27. The hub of piston 67 is slidably splined at 72ª to the tube 70 to hold the piston against rotation. A cap 68ª in a recess in the cover 54ª which forms a chamber around the outer open end of tube 70, forms a closure for said chamber.

The free-wheeling or one-way clutch between the input shaft 27 and the sun-gear shaft 36 for driving the sun-gear 35 during low speed operation, comprises an outer or driving member 81 which is fixedly splined to the input shaft 27; the inner member 79 which is fixedly splined at 80 to the sun-gear shaft 36; and rollers 83 held in a cage 82 between the cylindrical internal periphery on the driving member 81 and the cam surfaces on the outer periphery of the member 79 for driving the sun-gear shaft in one direction when the latter is free for rotation and for permitting the input shaft 27 to rotate around sun-gear shaft 36 when the latter shaft is locked against rotation. The construction of this free-wheeling or over-running clutch may be of any suitable construction, as well understood in the art. The inner member 79 of the free-wheeling clutch and the inner member 61 of the friction-clutch are secured against endwise movement on the inner end of sun-gear shaft 36 by a screw-collar 77 and a lock-ring 78. When the clutch disks 57, 59 are free or disengaged, driving member 81, through rollers 83, will drive the member 79 on the sun-gear shaft 36 and rotate the sun-gear 35 to cause the planet pinions 32 to be rotated bodily with the input shaft 27 and sun-gear shaft 36, for driving the impeller of the supercharger at low speed. During low speed operation of the impeller, the gear ring 30 will be driven at the same speed as shaft 27, and the sun-gear shaft 36 will rotate around the tube 70. When clutch-disks 57, 59 are engaged, member 79 of the one-way clutch on the sun-gear shaft 36 will be locked against rotation by said clutch and member 81 on the input shaft 27 will rotate freely around member 79 and sun-gear shaft 36. The input shaft 27 will then impart planetary movement to the planet gears 32 which will drive the gear-ring 30 at a higher speed than the input shaft, for the high speed operation of the impeller of the supercharger.

A manually controlled rotary valve 88 is mounted in the lower portion of head 19 of the casing and in one position permits the flow of oil under engine pressure from a duct 89 in the head section 19 to a duct 90 which communicates with the interior of cylinder 66 for shifting the piston 67 against the force of spring 69 to engage the clutch disks 57, 59. With valve 88 in a second position, it permits flow of the oil from duct 90 and cylinder 66 to a duct 91 which discharges the oil into the usual well in the casing section 17.

The surface between input shaft 27 and bushing 29 and the surface between bushings 37, 38 and sun-gear shaft 36 in the input shaft 27, the one-way clutch, and the disk-clutch are lubricated by oil from the pressure system of the engine delivered to a duct 100 which is formed in head 19. The bearing surface between bushing 29 and input shaft 27 communicate with duct 100 through a port extending through the bushing. Radial ports 101 extend through the wall of input shaft 27 and are communicatively connected to duct 100 for conducting oil through bushing 29 to an annular chamber 102 formed in the sun-gear shaft 36 and extending longitudinally between bushings 37, 38. From annular chamber 102, oil flows to the bearing surfaces between bushings 37, 38 and input shaft 27. Some oil passes between the bushing 38 and the inner periphery of input shaft 27 into a chamber 116 formed in shaft 36 from which it passes to the sun-gear 35 and planet-gears 32.

A radial port 103 in cross-wall 36ª in sun-gear shaft 36 communicatively connects annular chamber 102 and annular groove 104 in the bushing 73. An angularly extending duct 105 in bushing 73 communicates with annular groove 104 and the abutting bearing-faces on shoulder 71 of tube 70 and bushing 73 which are lubricated by oil passing from chamber 102 through port 103, groove 104 and duct 105. An annular chamber 106 around tube 70 is formed in the sun-gear shaft 36 and oil flows to said chamber 106 from the abutting faces on shoulder 71 and bushing 73.

Radial ports 134 communicate with chamber 106 and a duct 136 in member 79 of the one-way clutch, and conduct oil from chamber 106 to the working surfaces of said clutch. A port 140 is formed in the outer member 81 of the one-way clutch for the discharge of oil from said clutch into head 19 of the casing. Radial ports 141 extend through the wall of sun-gear shaft 36 and communicate with chamber 106 and the chamber 137 in member 61 of the disk-clutch. Radial ports 138 extend through the peripheral wall of member 61. Oil, in limited quantity, is conducted from chamber 106 via ports 141, chamber 137 and ports 138 to the surfaces of the disks 57, 59 of the disk-clutch.

The bearing for the inner end of the input shaft 27, the bearings for the planetary pinions 32 on stud-shafts 47 and the bearing for the side member 41 of the support for the gear-ring 30, are lubricated by oil from a duct 17ᵃ in section 17 to which oil is also delivered by the pressure lubricating system of the engine. An annular channel 117, formed in the internal periphery of bushing 50 in which side member 39 of the support for gear-ring 30 is journalled, is communicatively connected to duct 17ᵃ. Oil from channel 117 lubricates the bearing-surfaces between the hub of member 39 and bushing 50. Angularly extending ports 118 extend through the wall of the hub of member 39 and bushing 28 and communicatively connect annular channel 117 with annular channel 119 which is formed in the inner periphery of bushing 28, and conducts oil to the bearing-surfaces between the bushing 28 and the inner reduced end of input shaft 27. A radial port 120 extends through the wall of the reduced end of input shaft 27 and communicatively connects the annular channel 119 in bushing 28 with an annular channel 121 in the outer periphery of the ring or sleeve 27ᵇ which is fixedly secured in the bore of the inner end of input shaft 27 and conducts oil from channel 119 to channel 121. Ports 122 extend radially outward from channel 121 through the input shaft 27 and stud-shafts 47 and conduct oil from channel 121 into chambers 122ᵃ in said shafts. Stepped members 123ᵃ have ports 123 which communicatively connect the chambers 122ᵃ with the bearing-surfaces between the inner peripheries of bushings 32ᵃ in planetary pinions 32 and the outer peripheries of stud-shafts 47, respectively, and conduct oil from chambers 122ᵃ to said bearing-surfaces. The stud-shafts 47 are rotated at a high rate of speed around the axis of input shaft 27 during the high-speed operation of the transmission. Chambers 122ᵃ in shafts 47 act as a centrifuge for the sludge in the oil in said chambers. The sludge will be thrown by centrifugal force into the outer portions of chambers 122ᵃ. Each member 123ᵃ extends inwardly into chamber 122ᵃ a sufficient distance to prevent the sludge from passing through said member, so that clean oil will flow to the bearing-surfaces between bushings 32ᵃ and stud-shafts 47.

A duct 128 in input shaft 27 communicates with annular channel 121 and the bearing-surfaces between the inner periphery of the bearing in member 41 of the support for gear-ring 30 and the outer periphery of input shaft 27. Some oil from bearing 42 flows into the support for gear-ring 30 and aids in lubricating the planetary gearing. Excess oil from the planetary gearing escapes through a port 132 in member 41, while the gearing is in operation, into the well 17ᵇ in casing 17.

Oil from the bearing-surfaces between the bushing 50 and the hub of member 39 of the support for gear-ring 30 and from the bearing-surfaces between bushing 28 and the hub of shaft 27 passes into a chamber 130 in casing-section 17. Chamber 130 is in communication, through ring or sleeve 27ᵇ, with the open inner end of tube 70. The overflow oil, which accumulates in chamber 130, flows outwardly through tube 70 and through radial ports 133 into chamber 106. This oil supplements the oil flowing into chamber 106 from the abutting surfaces on shoulder 71 and bushing 73. Excess oil from the housing for the disk-clutch escapes through a port 139 in plate 55 into the chamber around the one-way clutch.

The operation of the lubricating system will be as follows: oil under pressure from duct 100 will flow to the bearing-surfaces between bushing 29 and input shaft 27, and oil will flow to the bearing-surfaces between bushings 37, 38 via port 101 and annular chamber 102. Oil, which works between bushing 38 and the inner periphery of input shaft 27, will pass into chamber 116 and to the sun-gear 35 and planet-gears 32. Oil, from the bearing-surfaces between the inner periphery of bushing 28 and the inner end of shaft 27, will also pass into the support for gear-ring 30, to lubricate the gears therein. The abutting thrust surfaces of shoulder 71ᵃ and bushing 73 will be lubricated by oil from annular chamber 102 via port 103, annular channel 104 and annular duct 105. Oil from the abutting thrust faces of bushing 73 and shoulder 71ᵃ will pass into chamber 106 via duct 136, to the working surfaces of the one-way clutch. Some oil will also pass from chamber 106, via ports 141 into the chamber of member 61 and ports 138 to the disks 57, 59 of the brake-clutch.

The bearing-surfaces between the hub of member 39 of the support for gear-ring 30 and bushing 50 will be lubricated by oil under pressure from duct 17ᵃ and channel 117. The bearing-surfaces between the hub of side member 39 and bushing 28 will be lubricated by oil flowing thereto through ports 118 from channel 117. The bearing-surfaces between bushings 32ᵃ in planet-gears 32 and stud-shafts 47 will be lubricated by oil from channel 119, via ports 120, channel 121, ports 122, chambers 122ᵃ and member 123ᵃ. The bearing 42 between the outer periphery of input shaft 27 and side member 41 of the support for gear-ring 30 will be lubricated by oil from channel 121 and duct 128.

Oil from the bearing-surfaces between bushing 50 and the hub of member 39 and the bearing-surfaces between bushing 28 and the input shaft 27 will flow into chamber 130 and the overflow will pass via ring or sleeve 27ᵇ, tube 70, ports 133 in tube 70, into chamber 106 from which oil flows, to duct 136, and the working surfaces of the one-way clutch, and also through ports 141, chamber 137 and ports 138 to the disks of the brake-clutch.

When the impeller is operated at the high-speed ratio: the relative rotation of shafts 27 and 36 will feed oil between bushing 38 and input shaft 27 to chamber 116 and the planet gearing; the rotation of the hub of member 39 around shaft 27 will feed oil via ports 120, channel 121 and ports 122 to chambers 122ᵃ in the stud-shafts 47 and from channel 121 via duct 128 to the bearing-surfaces between shaft 27 and member 41. Oil will also be fed from the bearing-surfaces of bushing 28 to chamber 130 from which it flows through tube 70, ports 133, chamber 106, and ports 141 to the disk-clutch and via ports 134 and 136 to the one-way clutch 79, 81. During high-speed operation, bushing 73 and shaft 36 will both be stationary and this will reduce the flow between the abutting faces of abutment shoulder 71ᵃ and bushing 73 to chamber 106.

During the operation of the impeller at the low-speed ratio: bushing 38 on sun-gear shaft 36 and input shaft 27 will rotate together, and the feed of oil between bushing 38 and shaft 27 to chamber 116 is reduced; bushing 28, the hub of member 39 and the inner end of shaft 27 will rotate together, and the bearing between bushing 50 and the hub of member 39 will be lubricated by oil from duct 17ᵃ and channel 117. During low-speed operation, bushing 73 will rotate around tube 70 and feed oil from duct 100 through ports 101, chamber 102, duct 103, channel 104 and duct 105 to the abutting thrust faces between said bushing and abutment shoulder 71ᵃ on tube 70.

In this lubricating system, the feeding of oil to the several parts requiring lubrication, is controlled proportionately to requirements of high-speed and low-speed operation.

The invention provides efficient lubricating and cooling means for the clutches for driving the sun-gear shaft and the clutch for locking it against rotation by oil passing through the bearings for the input shaft in the casing and the output gear support and the bearings between the input shaft and the sun-gear shaft. The invention also provides efficient means for lubricating the thrust-bearing for the stationary tube which conducts oil through the sun-gear shaft and provides an abutment for the spring which retracts the piston which actuates the disk clutch for locking the sun-gear shaft.

The invention is not to be understood as restricted to the details set forth, since these may be modified within the scope of the appended claims without departing from the spirit and scope of the invention.

Having thus described the invention, what I claim as new and desire to secure by Letters Patent is:

1. In a two-speed transmission for driving the impeller of a supercharger comprising a hollow input shaft, a plurality of bearings for the input shaft, a sun-gear, a shaft for the sun-gear extending through the input shaft, bearings for the sun-gear shaft in the input shaft, planet gears carried by the input shaft, an output gear-ring rotatable relatively to the input shaft and provided with a gear engaged by the planet gears, a clutch for locking the sun-gear and its shaft against rotation, and a clutch for driving the sun-gear shaft from the input shaft; a lubricating system comprising means for delivering oil under pressure to the engaging surfaces of the bearings for the input shaft, means for delivering oil from one of the bearings for the input shaft to the bearings for the sun-gear shaft in the input shaft, and means for delivering oil from the engaging surfaces of the other bearing for the input shaft through the sun-gear shaft to one of the clutches.

2. In a two-speed transmission for driving the impeller of a supercharger comprising a hollow input shaft, a sun-gear, a shaft for the sun-gear extending through the input shaft, bearings for the input shaft, bearings for the sun-gear shaft in the input shaft, planet gears carried by the input shaft, an output gear-ring rotatable relatively to the input shaft and provided with a gear engaged by the planet gears, a clutch for locking the sun-gear and its shaft against rotation, and a clutch for driving the sun-gear shaft from the input shaft; a lubricating system comprising means for delivering oil under pressure to the engaging surfaces of the bearings for the input shaft, means for delivering oil from one of the bearings for the input shaft to the bearings for the sun-gear shaft in the input shaft, and means for delivering oil from the engaging surfaces of the other bearing for the input shaft through the sun-gear shaft to both of the clutches.

3. In a two-speed transmission for driving the impeller of a supercharger comprising a hollow input shaft, a sun-gear, a shaft for the sun-gear extending through the input shaft, bearings for the input shaft, bearings in the input shaft for the sun-gear shaft, planet gears carried by the input shaft, an output gear-ring rotatable relatively to the input shaft and provided with a gear engaged by the planet gears, a clutch for locking the sun-gear and its shaft against rotation, and a clutch for driving the sun-gear shaft from the input shaft; a lubricating system comprising means for delivering oil under pressure to the engaging surfaces of the bearings for the input shaft, means for delivering oil from one of the bearings for the input shaft to the bearings for the sun-gear shaft in the input shaft and one of the bearings for the sun-gear shaft to the sun-gear, and means for delivering oil from the engaging surface of the other bearing for the input shaft through the sun-gear shaft to one of the clutches.

4. In a two-speed transmission for driving the impeller of a supercharger comprising a hollow input shaft, a sun-gear, a shaft for the sun-gear extending through the input shaft, bearings for the input shaft, bearings in the input shaft for the sun-gear shaft, planet gears carried by the input shaft, an output gear-ring rotatable relatively to the input shaft and provided with a gear engaged by the planet gears, a clutch for locking the sun-gear and its shaft against rotation, and a clutch for driving the sun-gear shaft from the input shaft; a lubricating system comprising means for delivering oil under pressure to the engaging surfaces of the bearings for the input shaft, means for delivering oil from one of the bearings for the input shaft to the bearings for the sun-gear shaft in the input shaft and from one of the bearings for the sun-gear shaft to the sun-gear, and means for delivering oil from the engaging surfaces of the other bearing for the input shaft through the sun-gear shaft to both of the clutches.

5. In a two-speed transmission for driving the impeller of a supercharger comprising a hollow input shaft, a plurality of bearings for the input shaft, a sun-gear, a shaft for the sun-gear extending through the input shaft, bearings in the input shaft for the sun-gear shaft, planet gears carried by the input shaft, an output gear-ring rotatable relatively to the input shaft and provided with a gear engaged by the planet gears, a clutch for locking the sun-gear and its shaft against rotation, and a clutch for driving the sun gear shaft from the input shaft; a lubricating system comprising means for delivering oil under pressure to the engaging surfaces of the bearings for the input shaft, a non-rotatable tube for delivering oil from the engaging surfaces of one of the bearings for the input shaft through the sun-gear shaft and means for delivering oil from said tube to one of the clutches.

6. In a two-speed transmission for driving the impeller of a supercharger comprising a hollow input shaft, a sun-gear, a shaft for the sun-gear extending through the input shaft, bearings for the input shaft, bearings in the input shaft for the sun-gear shaft, planet gears carried by the input shaft, an output gear-ring rotatable relatively to the input shaft and provided with a gear engaged by the planet gears, a clutch for locking the sun-gear and its shaft against rotation, and a clutch for driving the sun-gear shaft from the input shaft; a lubricating system comprising means for delivering oil under pressure to the engaging surfaces of the bearings for the input shaft, means for delivering oil from one of the bearings for the input shaft to the bearings for the sun-gear shaft in the input shaft, a non-rotatable tube for delivering oil from the engaging surfaces of the other bearing for the input shaft through the sun-gear shaft to one of the clutches, a thrust bearing between the tube and the sun-gear shaft, and means for delivering oil from the first mentioned bearing for the input shaft to the thrust bearing.

7. In a two-speed transmission for driving the impeller of a supercharger comprising a hollow input shaft, a sun-gear, a shaft for the sun-gear extending through the input shaft, bearings for the input shaft, bearings in the input shaft for the sun-gear shaft, planet gears carried by the input shaft, an output gear-ring rotatable relatively to the input shaft and provided with a gear engaged by the planet gears, a clutch for locking the sun-gear and its shaft against rotation, and a clutch for driving the sun-gear shaft from the input shaft; a lubricating system comprising means for delivering oil under pressure to the engaging surfaces of the bearings for the input shaft, means for delivering oil from one of the bearings for the input shaft to the bearings for the sun-gear shaft in the input shaft, a non-rotatable tube for delivering oil from the engaging surfaces of the other bearing for the input shaft through the sun-gear shaft to one of the clutches, a thrust bearing between the tube and the sun-gear shaft, and means for delivering oil from the first mentioned bearing for the input shaft to the thrust bearing and from the thrust bearing to one of the clutches.

8. In a two-speed transmission for driving the impeller of a supercharger comprising a hollow input shaft, bearings for the input shaft, a sun-gear, a shaft for the sun-gear extending through the input shaft, bearings in the input shaft for the sun-gear shaft, planet gears carried by the input shaft, an output gear-ring rotatable relatively to the input shaft and provided with a gear engaged by the planet gears, a clutch for locking the sun-gear and its shaft against rotation, and a clutch for driving the sun-gear shaft from the input shaft; a lubricating system comprising means for delivering oil under pressure to the engaging surfaces of the bearings for the input shaft, means for delivering oil from one of the bearings for the input shaft to the bearings for the sun-gear shaft in the input shaft, a non-rotatable tube for delivering oil from the engaging surfaces of the other bearing for the input shaft through the sun-gear shaft to both of the clutches, a thrust bearing between the tube and the sun-gear shaft, and means for delivering oil from the first mentioned bearing for the input to the thrust bearing and from the thrust bearing to both of the clutches.

9. In a two-speed transmission for driving the impeller of a supercharger comprising a hollow input shaft, a sun-gear, a shaft for the sun-gear extending through the input shaft, planet gears carried by the input shaft, a gear ring, a support for the gear ring, said gear-ring being provided with an output gear engaged by the planet gears, a plurality of bearings for the input shaft, a friction clutch for locking the sun-gear and its shaft against rotation, hydraulic means comprising a cylinder and a piston for controlling the friction clutch, a spring for retracting the piston, and a clutch for driving the sun-gear shaft from the input shaft; a lubricating system comprising means for delivering oil under pressure to the engaging surfaces of the bearings for the input shaft, a tube engaged by the spring extending through the sun-gear shaft, means for delivering oil into one end of the tube and from the tube to one of the clutches, a thrust bearing between the tube and the sun-gear shaft, and means for conducting oil through the sun-gear shaft to said thrust bearing.

10. In a two-speed transmission for driving the impeller of a supercharger comprising a hollow input shaft, a sun-gear, a shaft for the sun-gear extending through the input shaft, planet gears carried by the input shaft, a gear ring, a support for the gear-ring, said gear-ring being provided with an output gear engaged by the planet gears, a plurality of bearings for the input shaft, a friction clutch for locking the sun-gear and its shaft against rotation, hydraulic means comprising a cylinder and a piston for controlling the friction clutch, a spring for retracting the piston, and a clutch for driving the sun-gear shaft from the input shaft; a lubricating system comprising means for delivering oil under pressure to the engaging surfaces of the bearings for the input shaft, a tube engaged by the spring extending through the sun-gear shaft, means for delivering oil into one end of the tube and from the tube to both of the clutches, a thrust bearing between the tube and the sun-gear shaft, and means for conducting oil through the sun-gear shaft to said thrust bearing.

11. In a two-speed transmission for driving the impeller of a supercharger comprising a hollow input shaft, a sun-gear, a shaft for the sun-gear extending through the input shaft, planet gears carried by the input shaft, a gear ring, a support for the gear-ring said gear-ring being provided with an output gear engaged by the planet gears, a plurality of bearings in the input shaft for the sun-gear shaft, a friction clutch for locking the sun-gear and its shaft against rotation, hydraulic means comprising a cylinder and a piston for controlling the friction clutch, a spring for retracting the piston, and a clutch for driving the sun-gear shaft from the input shaft; a lubricating system comprising means for delivering oil under pressure to the engaging surfaces of the bearings for the input shaft, a tube engaged by the spring, extending through the sun-gear shaft and connected to receive oil from the engaging surfaces of one of the bearings for the input shaft, and means for delivering oil from the tube to one of the clutches, a thrust bearing between the tube and the sun-gear shaft, and means for conducting oil through the sun-gear shaft to said thrust bearing.

12. In a two-speed transmission for driving the impeller of a supercharger comprising a hollow input shaft, a sun-gear, a shaft for the sun-gear extending through the input shaft, planet gears carried by the input shaft, a gear ring, a support for the gear-ring said gear-ring being provided with an output gear engaged by the planet gears, a plurality of bearings for the input shaft, bearings for the sun-gear shaft in the input shaft, a friction clutch for locking the sun-gear and its shaft against rotation, hydraulic means comprising a cylinder and a piston for controlling the friction clutch, a spring for retracting the piston, and a clutch for driving the sun-gear shaft from the input shaft; a lubricating system comprising means for delivering oil under pressure to the engaging surfaces of the bearings for the input shaft, a tube engaged by the spring, extending through the sun-gear shaft and connected to receive oil from the engaging surfaces of one of the bearings for the input shaft, and means for delivering oil from the tube to both of the clutches, a thrust bearing between the tube and the sun-gear shaft, and means for conducting oil through the sun-gear shaft to said thrust bearing.

13. In a two-speed transmission for driving the impeller of a supercharger comprising a hollow input shaft, a sun-gear, a shaft for the sun-gear extending through the input shaft, planet gears carried by the input shaft, a gear ring, a support for the gear-ring, said gear-ring being provided with an output gear engaged by the planet gears, a plurality of bearings for the input shaft, a plurality of bearings in the input shaft for the sun-gear shaft, a friction clutch for locking the sun-gear and its shaft against rotation, hydraulic means comprising a cylinder and a piston for controlling the friction clutch, a spring for retracting the piston, and a clutch for driving the sun-gear shaft from the input shaft; a lubricating system comprising means for delivering oil under pressure to the engaging surfaces of the bearings for the input shaft, means for delivering oil from one of the input shaft bearings through the input shaft to the bearings in the input shaft from the sun-gear shaft, a tube engaged by the spring extending through the sun-gear shaft and connected to receive oil from the bearing surfaces of the other input shaft bearing and to deliver oil to one of the clutches, a thrust bearing between the tube and the sun-gear shaft, and means for conducting oil from one of the bearings for the input shaft through the sun-gear shaft to said thrust bearing.

14. In a two-speed transmission for driving the impeller of a supercharger comprising a hollow input shaft, a sun-gear, a shaft for the sun-gear extending through the input shaft, planet gears carried by the input shaft, a gear ring, a support for the gear-ring, said gear-ring being provided with an output gear engaged by the planet gears, a plurality of bearings for the input shaft, a plurality of bearings for the sun-gear shaft in the input shaft, a friction clutch for locking the sun-gear and its shaft against rotation, hydraulic means comprising a cylinder and a piston for controlling the friction clutch, a spring for retracting the piston, and a clutch for driving the sun-gear shaft from the input shaft; a lubricating system comprising means for delivering oil under pressure to the engaging surfaces of the bearings for the input shaft, means for delivering oil from one of the input shaft bearings through the input shaft to the bearings in the input shaft for the sun-gear shaft, a tube engaged by the spring extending through the sun-gear shaft and connected to receive oil from the bearing surfaces of the other input shaft bearing and to deliver oil to both of the clutches, a thrust bearing between the tube and the sun-gear shaft, and means for conducting oil from one of the bearings for the input shaft through the sun-gear shaft to said thrust bearing.

15. In a transmission comprising a hollow input shaft, a sun-gear, a shaft for the sun-gear journalled in the input shaft, planet gears meshing with the sun-gear, stud-shafts on which the planet gears are rotatably mounted and carried by the input shaft, a bearing for the input shaft and a gear ring meshing with the planet gears; a lubricating system comprising means for delivering oil under pressure to the bearing for the input shaft, oil retaining chambers in the stud-shafts, ducts for delivering oil from said bearing for the input shaft into said chambers, and tubular members in the walls of the stud-shafts for conducting oil to the bearings between the planet gears and the stud-shafts, and extending radially inwards of the outer portions of said chambers for preventing sludge in the chambers from passing to the bearings for the planet gears on the stud shafts.

16. In a two-speed transmission for driving the impeller of a supercharger, comprising a hollow input shaft, a sun-gear, a shaft for the sun-gear extending through the input shaft, planet gears carried by the input shaft, a gear-ring, a support for the gear-ring, said gear-ring being provided with a gear engaged by the planet gears, a stationary bearing for the input shaft, a bearing between the support and one end of the input shaft, a stationary bearing for the support, a clutch for locking the sun-gear and its shaft against rotation, and a one-way clutch for driving the sun-gear shaft from the input shaft; a lubricating system including, means for delivering oil under pressure through the stationary bearing for the support to the bearing between the input shaft and the support, and means for delivering oil from the bearing between the support and the input shaft, through the sun-gear shaft to one of the clutches.

17. In a two-speed transmission for driving the impeller of a supercharger, comprising a hollow input shaft, a sun-gear, a shaft for the sun-gear extending through the input shaft, planet gears carried by the input shaft, a gear-ring, a support for the gear-ring, said gear-ring being provided with a gear engaged by the planet gears, a stationary bearing for the input shaft, a bearing between the support and one end of the input shaft, a stationary bearing for the support, a clutch for locking the sun-gear and its shaft against rotation, and a one-way clutch for driving the sun-gear shaft from the input shaft; a lubricating system including means for delivering oil under pressure through the stationary bearing for the support to the bearing between the support and the input shaft, and means for delivering oil from the bearing between the support and the input shaft, through the sun-gear shaft to both of said clutches.

18. In a two-speed transmission for driving the impeller of a supercharger, comprising a hollow input shaft, a sun-gear, a shaft for the sun-gear extending through the input shaft, planet gears carried by the input shaft, a gear-ring, a support for the gear-ring, said gear-ring being provided with a gear engaged by the planet gears, a stationary bearing for the input shaft, a bearing between the support and one end of the input shaft, a stationary bearing for the support, a clutch for locking the sun-gear and its shaft against rotation, and a one-way clutch for driving the sun-gear shaft from the input shaft; a lubricating system including means for delivering oil under pressure to the stationary bearing for the support, and a non-rotatable tube extending through the sun-gear shaft, for delivering oil from the bearing for the support and the bearing between the support and the input shaft, through the sun-gear shaft to one of the clutches.

19. In a two-speed transmission for driving the impeller of a supercharger, comprising a hollow input shaft, a sun-gear, a shaft for the sun-gear extending through the input shaft, bearings between the sun-gear shaft and the input shaft, planet gears carried by the input shaft, a gear-ring, a support for the gear-ring, said gear-ring being provided with a gear engaged by the planet gears, a stationary bearing for the input shaft, a bearing between the support and one end of the input shaft, a stationary bearing for the support, a clutch for locking the sun-gear and its shaft against rotation, and a one-way clutch for driving the sun-gear shaft from the input shaft; a lubricating system including means for delivering oil under pressure to the stationary bearing for the support to the bearing between the support and the input shaft, means for delivering oil from the stationary bearing for the input shaft through the sun-gear to the bearings in the input shaft for the sun-gear shaft, a tube for delivering oil from the stationary bearing for the support and the bearing between the support and the input shaft, through the sun-gear shaft to one of the clutches, a thrust bearing for the tube in the sun-gear shaft, and means for conducting oil through the sun-gear shaft to the thrust bearing.

JOHN H. CARPENTER.